April 14, 1942. E. BUGATTI 2,279,615

AIRCRAFT

Filed May 3, 1939 4 Sheets-Sheet 1

Inventor:
Ettore Bugatti,

Attorneys

Patented Apr. 14, 1942

2,279,615

UNITED STATES PATENT OFFICE 2,279,615

AIRCRAFT

Ettore Bugatti, Paris, France

Application May 3, 1939, Serial No. 271,564
In Luxemburg May 6, 1938

26 Claims. (Cl. 244—42)

The present invention relates to aircrafts.

It is known that an aircraft wing of invariable section has not the same advantages for all the conditions in which the aircraft may be called upon to fly. For instance, an aerofoil of high lift-to-drag ratio, which is advantageous at high speeds, is generally insufficient as to lift for permitting a low landing speed. This drawback is found, in particular, in the case of aircrafts intended to fly under various conditions.

In order to obviate to a certain degree the drawback in question, the supporting surfaces of aircrafts, and in particular the trailing edges of their wings, have been fitted with lift increase devices, lift decrease devices, or aerodynamic braking devices, capable of modifying the lift and drag characteristics of said supporting surfaces, that is to say, in other words, to modify the polar curves of these machines.

But, up to the present time, the pilot had to bring into play, at the desired time, the device or devices most favorable to the kind of flight considered, such as flight at high or low speed, dive, flight with or without the engine running, taking off, landing, etc.

Furthermore, when this particular kind of flight called for the bringing into play of several of the devices above mentioned, the pilot had to control them separately.

The chief object of the present invention is to provide an aircraft which is better adapted to meet the requirements of practice and to avoid the drawbacks above mentioned than those made up to this time, and, in particular, which is easier to pilot.

Another object of the invention is to provide an aircraft including means for automatically modifying its speed in accordance with the conditions under which it is flying, without substantially modifying the lift if such a modification is not necessary.

Other objects and advantages of the present invention will result from the following detailed description of some specific embodiments thereof.

Preferred embodiments of the present invention will be hereinafter described, with reference to the accompanying drawings, given merely by way of example, and in which:

Fig. 11 is a similar view relating to a third embodiment.

In the following description, it will be supposed, by way of example, that the aircraft is of the monoplane type.

This aircraft is made in the conventional manner, including, for instance, a thick low wing.

Said wing is then fitted with means capable, when they are operated, of varying, according to independent laws, the aerodynamic lift and drag characteristics of the airplane, and therefore also of varying the ratio of said characteristics. Preferably, according to the invention, these means are operated through a single control system.

According to the essential feature of the invention, these means are controlled in such manner as to bring into play the means most favorable for the flight to be performed automatically according to the nature of said flight.

For this purpose, according to a very simple embodiment, these means may include, on at least a portion of the trailing edge of the wing 1, two superposed flaps 2 and 3, of the usual type.

These flaps can be pivoted simultaneously toward the upper side or the under side of the wing according as it is desired to obtain an increase of lift (case of flight with high angle of incidence) or a reduction of lift (case of flight with minimum drag).

These flaps can also be pivoted away from each other if it is desired to produce an aerodynamic braking with a view to producing, in gliding flight, a modification of the downward speed for a given slope, or a modification of the slope for a given speed, such a braking being, of course, eventually produced, if so desired, or if necessary, simultaneously with the modifications above mentioned.

Concerning now the adaptation of the modifications above mentioned (lift increase, lift reduction, aerodynamic braking) to the various manoeuvres of the aircraft or, more generally, to the various kinds of flights to be performed, it can, of course, be obtained in many different ways, the solution that is chosen being influenced by many external factors, for instance the kind of utilization for which the aircraft is intended.

However, it seems that, in most cases, it is advantageous to utilize flaps 2 and 3 according to the solution which will now be specifically described, by way of example, and according to which the following modifications are made to correspond to the various kinds of flight of the aircraft.

Considering first the case of normal flight with the engine running, the different conditions of flight which will be taken into account are, among others, taking off, flying with the minimum of drag, and flying with the maximum of speed. These three particular conditions of flight correspond respectively to points $A_2$, $A_1$ and $A_3$ on the polar curve of the basic aerofoil section I, which polar curve is shown at P on Fig. 7 of the drawings.

Figure 2:
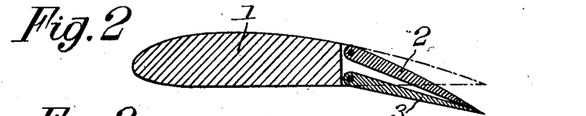
Figure 2:
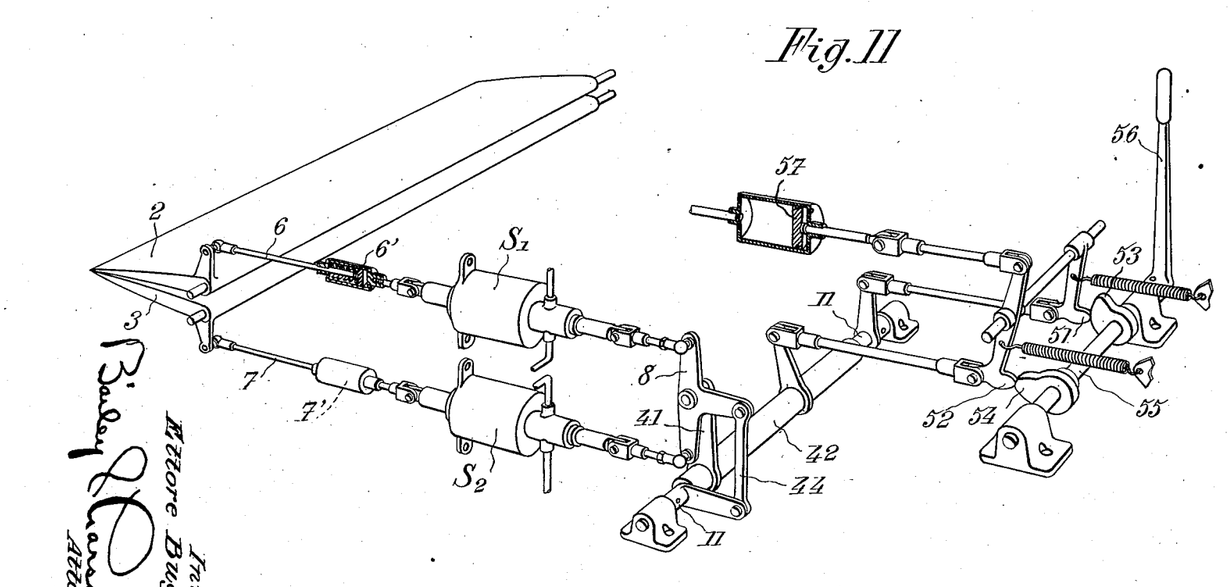

In order to facilitate the taking off of the airplane, an increase of lift is obtained by moderately and simultaneously pivoting flaps 2 and 3 toward the under side of the wing (position shown by Fig. 2). To the new characteristics ($Cx$ and $Cz$) of wing I, there corresponds, on the diagram of Fig. 7, a point $B_2$ located above the point $A_2$ corresponding to taking off with the unmodified aerofoil section of said wing.

Figures 1, 3, 4:
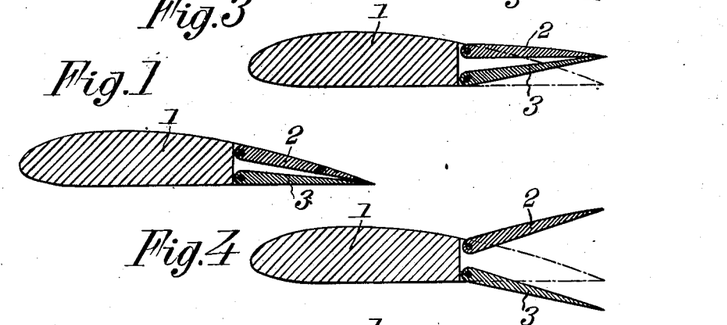
Figs. 1 to 6 are sectional views of an aerofoil provided with flaps according to the invention, these flaps being shown, in these respective views, as occupying different positions.

In the case of flying with minimum drag (maximum of $Cz/Cx$), these flaps are brought back into the natural position shown by Fig. 1 and the corresponding point of the diagram remains at $A_1$, corresponding to the angle of best possible lift to drag ratio $\beta$.

Finally, when flying with the maximum speed, the drag is reduced by slightly pivoting flaps 2 and 3 toward the upper side of the wing (position shown by Fig. 3). This corresponds to a reduction of the lift of wing I, the aerodynamic characteristics of which then correspond to a point $B_3$ located on the same side of the polar curve P as the above mentioned point $B_2$.

Figure 7:
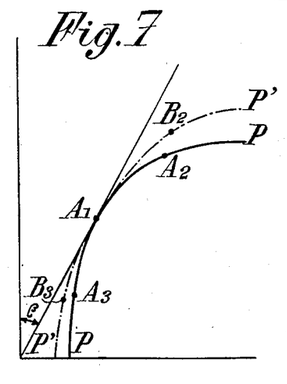
Figs. 7 and 8 are diagrams illustrating the principle of the invention.

It will be readily understood that, if the adaptation of the pivoting of the flaps has taken place in a continuous manner between the time of taking off and the time when the aircraft is flying with the maximum speed, it is possible to have, corresponding to the successive angles of incidence of the basic aerofoil section I, a whole series of points which determine a new polar curve P' passing through points $B_3$, $A_1$ and $B_2$.

This polar curve, which takes into account, for each angle of incidence (that is to say for each kind of flight of the airplane), the correcting effects produced by flaps 2 and 3, can therefore be considered as the optimum polar curve of the airplane flying with the engine in operation.

Figure 8:
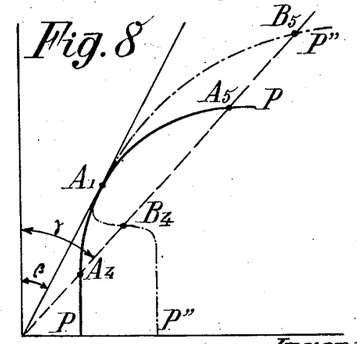

Considering now the case of flight with the engine cut off or with the engine idling (gliding flight, dive, manoeuvres for landing) it will be necessary to produce the following adaptations of flaps 2 and 3, the corresponding modifications of the characteristics of the wing being designated by the diagram of Fig. 8.

When the airplane is gliding with the angle of optimum lift-to-drag ratio $\beta$, the flaps are placed in the natural position, and the corresponding point of the curve is located at $A_1$ on polar P.

When the airplane is diving (flying along a slope of an angle $\gamma$ greater than $\beta$), which would correspond, for instance, to the point $A_4$ of polar P, aerodynamic braking is obtained by bringing flaps 2 and 3 into a position for which they are turned away for each other, as shown by Fig. 4. The speed of the airplane along its trajectory is then reduced and the corresponding point of the curve of the wing thus modified is $B_4$, the $Cx$ and $Cz$ of which are higher than those of point $A_4$.

Figures 5, 6:
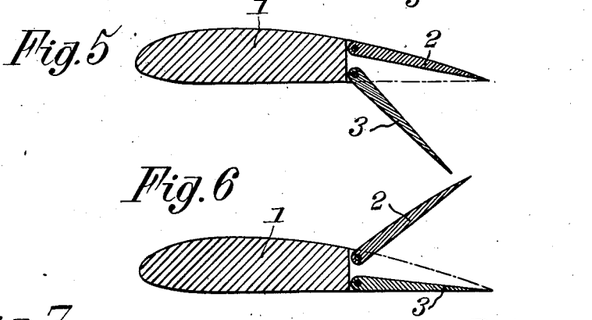

When the airplane is pulled out from the dive, before landing (which would for instance correspond to a point $A_5$ on polar curve P) it is of advantage to produce simultaneously an increase of the lift and an aerodynamic braking. For this purpose, the flaps are caused to make an angle turned toward the under side of the wing as shown by Fig. 5. The corresponding point of the polar curve of the wing thus modified is $B_5$, the $Cx$ and $Cz$ of which are greater than those of point $A_5$.

It will be readily understood that it is possible, in this case also, by gradually displacing flaps 2 and 3, to produce a continuous curve P'' described by the point representing, for each incidence, the aerodynamic characteristics of wing I, account being taken of the effects produced by said flaps. This curve P'' represents the optimum polar curve of the airplane when flying with the engine cut off.

Finally, considering the case of the airplane running on the ground, that is say taxiing, it is advantageous, in this case to bring flaps 2 and 3 in a position away from each other and turned toward the upper side of the wing (position shown by Fig. 6), so that the aerofoil thus modified undergoes a reduction of the lift and an aerodynamic braking.

Concerning then the device to be provided for automatically controlling the displacements of flaps 2 and 3 according to the nature of the flight, it is devised in such manner that it permits, in each of the cases above considered, of obtaining the optimum polar curve P' or P'', or of producing the reduction of lift and the aerodynamic braking of the airplane when taxiing after landing.

Advantageously, the control device is made in the following manner:

Flaps 2 and 3 are controlled, for their simultaneous pivoting, through an element capable of detecting variations of speed of the airplane along its path of travel. Such an element may, for instance be a Venturi tube located in the direction of the wind, or again a piece of the system for operating the control surfaces of the airplane, which control surfaces determine, according to the relative angle through which they have been pivoted, the flying speed of said plane, so that their position is connected to this speed according to a predetermined law. I may also employ other devices responsive to the flying conditions of the airplane, for instance to its incidence.

I further provide a mechanism capable of moving said flaps away from each other when the engine is throttled and when the speed of the airplane is located on the outside of a given zone, the high limit of this zone corresponding to the airplane diving and the lower limit to landing manoeuvres.

Finally, I provide further means for moving flaps 2 and 3 away from each other, while turning them simultaneously toward the upper side of the wing when the airplane is running on the ground, after landing, the bringing into play of these last mentioned means being advantageously produced by the operation of wheel brakes of the airplane.

Of course, such systems may be made in many different manners, but I consider it is advantageous to have recourse to one of the embodiments which will be hereinafter described and in which I make use, for operating flaps 2 and 3, of servo-motors, for instance actuated by a fluid under pressure.

Figure 9:
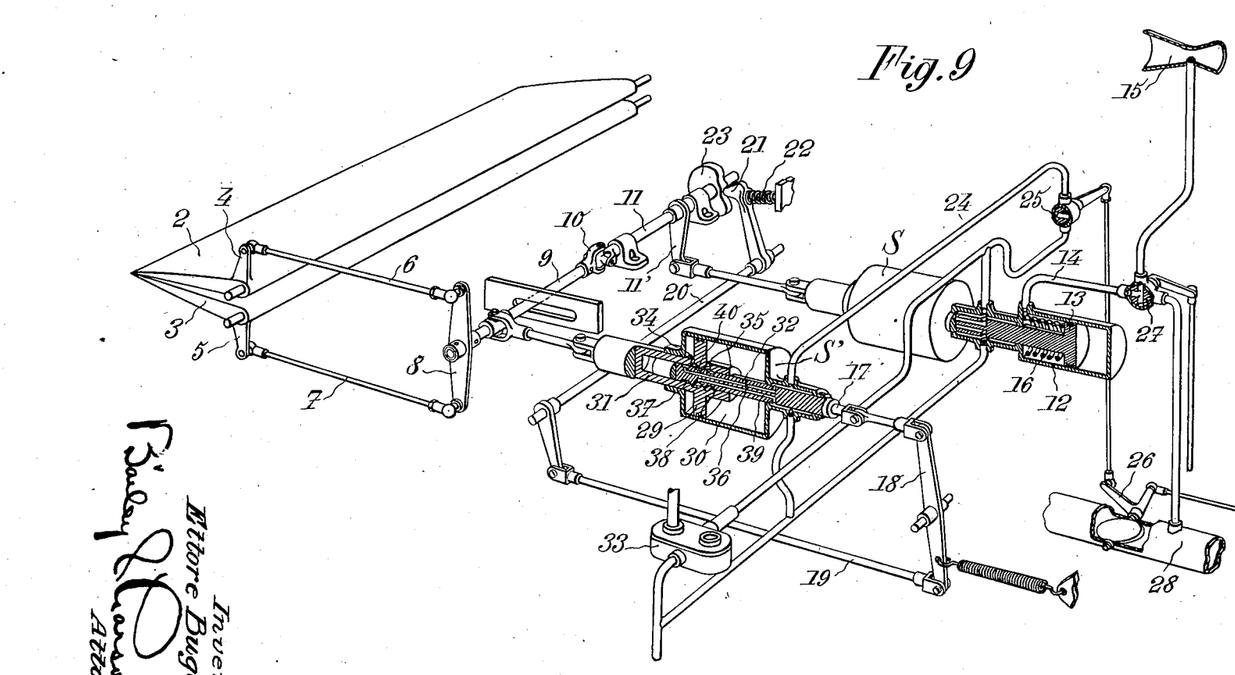
Fig. 9 is a perspective view, with parts cut away, diagrammatically showing a first embodiment of the device for controlling said flaps.

According to a first embodiment, illustrated by Fig. 9, the axes of flaps 2 and 3 carry, fixed thereon, arms 4 and 5 which are connected, respectively through connecting rods 6 and 7, to the ends of the arms of an equalizer bar 8 adapted to rotate together with a shaft 9. This shaft is itself controlled, through the intermediate of a Cardan or similar joint, 10, by a shaft 11, the angle made by these two shafts being variable so as to permit of pivoting said flaps away from each other.

In order to produce the rotation of shafts 9 and 11 (that is to say to produce a simultaneous rotation of flaps 2 and 3, both in the same direction) I provide a driving element operative by a device responsive to variations of the speed of the airplane along its path of travel. This driving element includes, for instance, a cylinder 12, the piston 13 of which is subjected to the action of a spring 16. This cylinder is connected, through a conduit 14, with a Venturi tube 15. The movable element of this system is caused to coact, through a servo-motor S, which will be hereinafter more fully described, with an arm 11' rigid with shaft 11 in rotation. The whole is arranged in such manner that, to an increase of the suction in cylinder 12 (corresponding to an increase of the speed of the airplane along its path of travel) there corresponds an upward movement of flaps 2 and 3 against the action of said spring 16, which is interposed between piston 13 and the end of cylinder 12.

In order to produce the displacements of shaft 9 which are to produce the movements of flaps 2 and 3 away from each other, I make use of a driving element controlled by the rotation of shaft 11 (that is to say, indirectly, by Venturi tube 15 since the angular position of said shaft 11 depends upon the drop of pressure in said Venturi tube). This last mentioned driving element is constituted, for instance, by coupling shaft 9 with a servo-motor S' the pilot element 17 of which is connected, for instance through the intermediate of a lever 18, to a rod 19 and an axis 20 and finally to a finger 21. This finger 21 is kept applied, by means of a spring 22, against a cam 23 keyed on shaft 11. The outline of this cam is such that it ensures the actuation of pilot member 17 in the direction corresponding to the moving of the flaps away from each other when the angular position of shaft 11 exceeds the limit values corresponding respectively to flight at high speed and to landing manoeuvres.

Mounted on the feed conduit 24 of servo-motor S', there is a valve or the like 25 the control means of which are connected to means 26 for controlling the feed of the engine of the airplane in such manner that, when said engine is normally fed, said valve is closed and servo-motor S' does not receive any motive fluid.

Finally, the control means to be brought into play when the airplane is running along the ground are obtained by providing, on the conduit 14 which connects Venturi tube 15 with cylinder 12, a three-way valve 27 adapted to permit, according to the position it occupies, of connecting said cylinder with the Venturi tube, or with a space where there is a low pressure, for instance with the intake tube 28 of the engine, the operation of this valve being conjugated with that of the wheel brakes of the airplane in such manner that cylinder 12 is connected with tube 28 when the brakes in question are operated.

It should be noted that the same result might be obtained by sending into cylinder 12, at the proper time, a fluid under pressure (for instance the fluid serving to operate the wheel brakes of the airplane) which would be caused to act on piston 13 in such manner as to ensure the compression of spring 16.

Concerning now servo-motors S and S', they can be made in any suitable manner, for instance as shown by Fig. 9.

In this case, the motive element of each of these servo-motors is constituted by a piston 29 sliding in a cylinder 30, the rod 31 of said piston being provided with a hole along its axis in such manner as to be able to guide the sliding displacements of a rod 32 rigid with the pilot element of the servo-motor, for instance a rod 17 in the case of servo-motor S'.

I provide, in rods 31 and 32, a distribution system which permits of causing a fluid under pressure, for instance oil supplied by a pump 33, to act on one or the other of the faces of a piston 29, according to the position occupied by said rod 32.

It will be readily understood that it is possible to obtain that piston 29 and rod 31 follow rod 32 in its various displacements, which necessitate the play of relatively low efforts, the energy received on rod 31 being the more important as the section of piston 29 and the discharge pressure of pump 33 are higher.

Such a distribution system may, for instance, be made as follows:

In rod 31, I provide conduits 34 and 35 located on either side of piston 29 and which may act both as feed conduits and as discharge conduits.

In rod 32, I provide, on the one hand, a feed conduit 36 leading to two annular recesses 37 and 38 capable of being brought opposite, respectively, conduit 34 and conduit 35, and, on the other hand, a discharge conduit 39 which leads to a recess 40 arranged in such manner, between recesses 37 and 38, that, when one of these recesses is brought opposite that of the conduits 34 and 35 to which it corresponds, recess 40 comes opposite the other of said conduits, thus permitting the discharge of the part of cylinder 30 which is not under pressure.

It should be noted that these servo-motors might be constituted by a mere system including a cylinder and a piston, and the piston of which would be subjected, on one of its faces, to the pressure of a fluid escaping through a calibrated orifice, the pilot element of the servo-motor being, in this case, constituted by a valve mounted on the feed circuit of the cylinder.

The automatic control system above described works as follows:

When flying with the engine running, valve 25 is closed and only servo-motor S is fed with fluid under pressure. Flaps 2 and 3 then remain juxtaposed to each other and they occupy, under the action of said servo-motor S, a position which is the higher as the suction is more important, which corresponds to the adaptation of the inclination of the flaps permitting to obtain the optimum polar curve P'.

On the contrary, when the airplane is flying with the engine throttled, said valve is open. If, furthermore, cam 23 is in a position corresponding to the speed of the airplane being outside of the zone above mentioned, it produces, through the intermediate of servo-motor S', the displacement of flaps 2 and 3 away from each other, as well when the airplane is diving as when it is manoeuvring for landing, which permits of obtaining aerodynamic characteristics of the airplane corresponding to the polar curve P''.

When the airplane is pulled out from the dive, preparatory to landing, the angle made by flaps 2 and 3 has its bisector line turned toward the underside of the wing, this position being that shown by Fig. 5, since, at this time, the speed of the airplane is reduced and, therefore, the suction produced in cylinder 12 is relatively low.

On the contrary, when the airplane has landed and its wheel brakes enter into action, the three-way valve 27 comes to occupy a position in which it connects said cylinder 12 with the intake pipe 28 in which there is a certain vacuum due to the fact that the engine is idling. The angle formed by flaps 2 and 3 is then turned toward the upper side of the wing and the lift decrease and the braking are obtained as desired.

Figures 10, 10A:
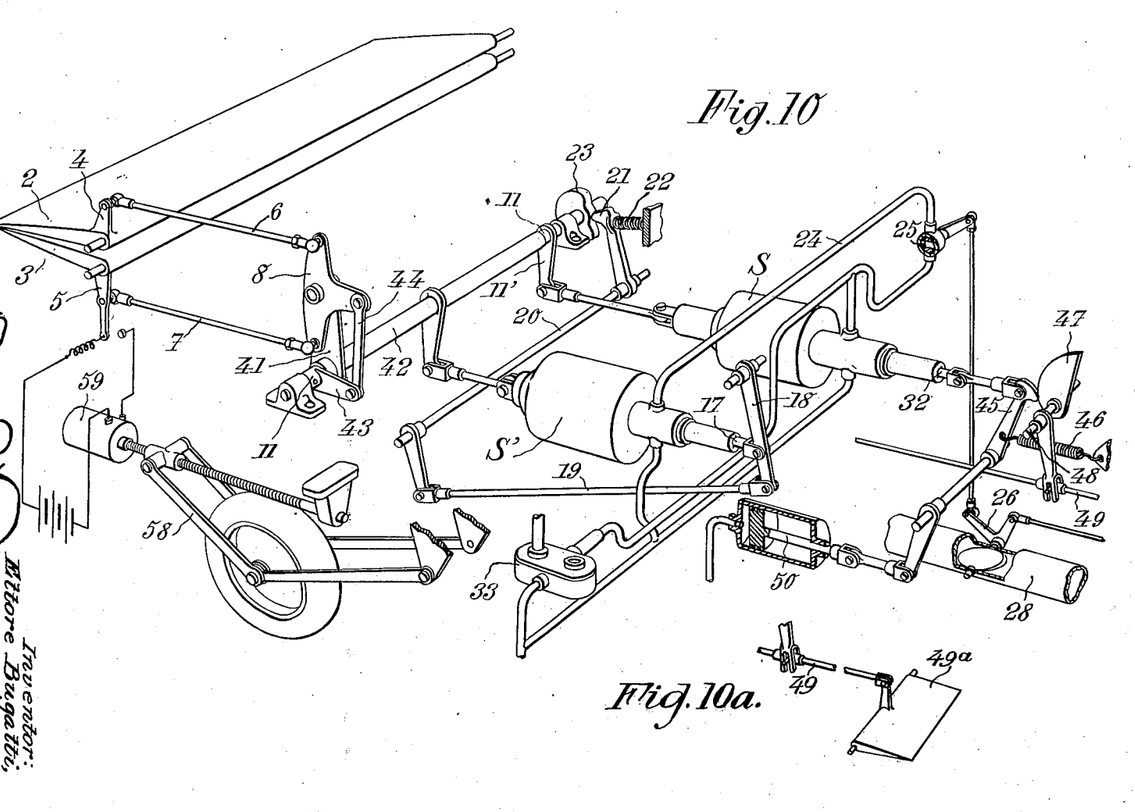
Fig. 10 is a view, similar to Fig. 9, showing another embodiment of such a device.
Fig. 10a is a perspective view disclosing the rudder and operating connections thereof to the device of Fig. 10.

In the embodiment illustrated by Fig. 10, servo-motor S, instead of being operated by a Venturi tube, is controlled by a part belonging to the means for controlling the depth control surfaces 49a of the airplane.

The means for actuating flaps 2 and 3 are made in any suitable manner, for instance as above described, or again, in the manner shown by Fig. 10. In this embodiment, the axis of equalizer bar 8 is carried by an arm 41 adapted to turn together with a sleeve 42 coupled in such manner with servo-motor S' that the latter can, under the same circumstances as above explained (diving and manoeuvring for landing) produce a rotation of said sleeve and of arm 41 rigid therewith, in a direction corresponding to the opening of flaps 2 and 3. The pivoting of the whole of these flaps is produced by a shaft 11 mounted coaxially with sleeve 42 and coupled with servo-motor S connected to equalizer bar 8 through an arm 43 and a connecting rod 44.

Servo-motor S' is controlled, as in the above embodiment, by a cam 23 keyed on shaft 11, the feed of fluid under pressure to said servo-motor being controlled by a valve 25 subjected to the action of the means for adjusting the feed of the engine.

The rod 32 of servo-motor S is connected through a link to a finger 45, applied by a spring 46 against a cam 47 keyed on a shaft 48 coupled with the system 49 for controlling the elevator, said cam having an outline such that, for the various positions of said elevator, that is to say for the various values of the speed of the airplane, flaps 2 and 3 are brought in positions corresponding to the successive points of polar curve P'.

The connection between the braking on the wheels of the airplane and the pivoting of the flaps in the upward direction is obtained by providing an auxiliary jack 50, subjected to the pressure of the fluid for controlling the brakes and capable of displacing finger 45, when the brakes are applied, in the direction which produces an upward pivoting of said flaps.

The operation of such control means is the same as that above described with reference to the preceding embodiment, with the difference, however, that the pivoting of the flaps, instead of being produced by a Venturi tube, is produced by cam 47.

It should be noted that, in this case, it is advantageous to arrange the servo-motors in such manner that they work only with a certain delay (these servo-motors being, for instance, adapted to work with an adjustable delay) so that the quick operations of the elevator, intended to compensate atmospheric disturbances, do not produce the actuation of flaps 2 and 3.

In all cases, whatever be the embodiment that is adapted, I obtain an airplane which has, among other advantages:

a. That of flying always with the characteristics of an optimum polar curve;

b. That of being easy to pilot since the control of the flaps does not call for any intervention of the pilot; and c. That of ensuring a great safety of flying since the starting of every maneuver automatically produces the bringing into play of devices capable of facilitating this maneuver.

Although the automatic operation of the flaps is a very great advantage, it is however possible, in some cases, to meet circumstances in which it may be useful to use in an independent manner the characteristic of the invention which consists in subjecting the means for pivoting simultaneously both of the flaps and the means for pivoting the flaps with respect to each other to a single control system, this system being then actuated at will by the pilot and adapted to ensure the obtainment of the best possible polar curves as above mentioned.

I may, for instance, make use of the embodiment illustrated by Fig. 11, in which it has been supposed, by way of example, that use is made, for operating the relays, of servo-motors which are controlled simultaneously and not successively as in the preceding embodiments.

According to this embodiment of the invention, the means for actuating the flaps 2 and 3 are made according to the preceding embodiment, that is to say their simultaneous pivoting is produced by a shaft 11 and their movement with respect to each other is produced by a sleeve 42, these flaps being urged toward the closed position by a pair of springs 6' and 7' respectively mounted on rods 6 and 7.

I mount, on the latter, servo-motors $S_1$ and $S_2'$ similar for instance to the servo-motors S and S' above mentioned and capable of displacing said rods in one direction or the other.

I connect with shaft 11 and sleeve 42 fingers 51 and 52 which are caused to coact, respectively, with cams 53 and 54 mounted on a same shaft 55 controlled through a lever 56, said cams having outlines such that they permit of obtaining the various desired combinations of pivoting and relative angular opening or closing.

I further provide means for rendering inoperative the cam 54 (which controls the movements of the flaps with respect to each other) when the engine is running. These means consist for instance of a push piece 57, for instance hydraulically operated, capable, when it is actuated, of retaining finger 52 in the position for which flaps 2 and 3 are applied against each other.

The automatic control means and the manual control means might be combined.

Also, according to the invention, the aerodynamic braking means may be automatically controlled in accordance with the speed of the airplane along its path, without being interconnected with the lift varying means, which are operated either automatically or under the pilot's control, so that the operation of the braking means in question does not substantially modify the lift.

Such an arrangement would, for instance, be obtained if, in the embodiment of Fig. 11, shaft 55 were interrupted in its middle part, so as to permit independent pivoting of cams 53 and 54. Cam 54 would then be controlled, through any suitable means, such for instance as above described (Venturi tube, connection with the elevator control, etc.), according to the speed of the airplane along its path of travel, thus bringing the aerodynamic braking means into play when the airplane speed is outside the limits above referred to. Of course, in this case, the operation of said braking means leaves the lift varying means uninfluenced.

I may also complete the mechanisms above described by providing the following device, which might also be used separately.

According to this device, the airplane being provided with a retractable landing gear 58 (Fig. 10) this gear is interconnected with the lift increase device and/or the aerodynamic braking means in such manner that the lowering of said landing gear is produced by the operating of said device and/or means.

For this purpose, for instance, I cause flap 3 or an element connected with said flap, such for instance as arm 5, to act on an electric contactor such that, when flap 3 is turned downward to a considerable extent, it closes an electric circuit starting an electric motor 59 capable of lowering the landing gear.

With such an arrangement, the pilot needs not bother with the lowering of the landing gear and any risk of forgetting to lower the landing gear is avoided.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An aircraft which comprises, in combination, at least one wing, at least two flaps both pivoted to said wing in such manner as to vary the lift of said wing when both pivoted together and to vary the drag when pivoted with respect to each other, means operative in accordance with the speed of said aircraft along its path of travel for simultaneously pivoting both of said flaps as a whole with respect to said wing, distinct means for pivoting said flaps with respect to each other, and means for interconnecting said two above mentioned means, the second mentioned means being adapted to act only when said speed exceeds a given upper limit value or is below a given lower limit value.

2. An aircraft which comprises, in combination, at least one wing, an engine, means for varying the lift of said wing, aerodynamic braking means associated with said wing, means for operating said braking means according to the speed of said aircraft along its path of travel, adapted to act only when said speed is above an upper limit or below a lower limit, and means operative by said engine, for making these braking means inoperative when said engine is in operation.

3. An aircraft which comprises, in combination, at least one wing, an engine, means for varying the lift of said wing, aerodynamic braking means associated with said wing, means for operating said braking means according to the speed of said aircraft along its path of travel, adapted to have no influence on said lift varying means, said brake operating means being arranged to act only when said speed is above a given upper limit or below a given lower limit, and means operative by said engine for locking said braking means in inoperative position when said engine is running so as to drive said aircraft.

4. An aircraft which comprises, in combination, at least one wing, an engine, means for varying the lift of said wing, aerodynamic braking means associated with said wing, a single control means for operating said lift varying means and said braking means according to the speed of said aircraft along its path of travel, said control means being adapted to act on said braking means only when said speed is above a given upper limit or below a given lower limit, and means controlled by said engine for preventing said control means from acting on said braking means when said engine is running in such manner as to drive said aircraft.

5. An aircraft which comprises, in combination, at least one wing, an engine, a system associated with said wing adapted to undergo two distinct kinds of displacement with respect thereto, one corresponding to variations of the lift of said wing and the other to variations of the drag thereof, means for producing the first mentioned kind of displacement of said system, means for producing the second mentioned kind of displacement of said system in accordance with variations of the speed of said aircraft along its path of travel, said last mentioned means being adapted to act only when said speed is above a given upper limit or below a given lower limit, and means controlled by said engine for locking said last mentioned means in inoperative position when said engine is running in such manner as to propel said aircraft.

6. An aircraft which comprises, in combination, at least one wing, at least one engine, two flaps both pivoted to said wing in such manner as to vary the lift of said wing when both pivoted together and to vary the drag when pivoted with respect to each other, means operative in accordance with the speed of said aircraft along its path of travel for simultaneously pivoting both of said flaps as a whole with respect to said wing, distinct means for pivoting said flaps with respect to each other, means for interconnecting the two above mentioned means, the second mentioned means being adapted to act only when said speed exceeds a given upper limit value or is below a given lower limit value, and means, controlled by said engine, for preventing said second mentioned means from acting when said engine is running in such manner as to propel said aircraft.

7. An aircraft according to claim 5 in which the means for producing the second mentioned kind of displacement include a Venturi tube carried by said aircraft in the direction of the relative wind.

8. An aircraft according to claim 2, further including an elevator, means for controlling said elevator, and means for connecting the last mentioned means with the means for operating said braking means.

9. An aircraft according to claim 5, further including an elevator, means for controlling said elevator, and means, adapted to act with a certain delay, for connecting the last mentioned means with the means for producing the second mentioned kind of displacement of said system.

10. An aircraft according to claim 2, further including actuating means for operating said means for varying the lift of the wing according to the speed of said aircraft along its path of travel, wheels for supporting said aircraft on the ground, brakes for said wheels, and means operatively connected with said brakes for operating said actuating means, when said brakes are applied, in the direction corresponding to a reduction of the lift, and simultaneously operating the third mentioned means of claim 2 in the direction which increases the drag.

11. An aircraft according to claim 2, further including a retractable landing gear, and means operatively connected with said third mentioned means of claim 2 for lowering said landing gear when said speed is below said lower limit.

12. An aircraft having elevation control surfaces and first operating means operating said elevation control surfaces, and at least one wing, movable surface means on at least a portion of said wing effecting aerodynamic braking of said aircraft and, simultaneously, maintaining substantially constant the lift characteristics of said portion of said wing and said movable surface means, and second operating means controlled by said first operating means for operating said movable surface means to effect said braking.

13. An aircraft having elevation control surfaces, first operating means movable between predetermined positions corresponding, respectively, to normal and abnormal flight conditions, at least one wing, movable surface means on at least a portion of said wing effecting aerodynamic braking of said aircraft and, simultaneously maintaining substantially constant the lift characteristics of said portion and said movable surface means, and second operating means controlled by movement of said first operating means to a position corresponding to abnormal flight conditions for operating said movable surface means to effect said braking.

14. An aircraft having curved lifting surfaces, adjustable flap means for varying the curvature of said surfaces to adjust the lift effect thereof, first operating means for adjusting said flap means, said first operating means being movable between positions corresponding, respectively, to normal and abnormal flight conditions, movable surface means on a portion of the lifting surfaces of said aircraft effecting aerodynamic braking of said aircraft and, simultaneously maintaining substantially constant the lift characteristics of said portion, and second operating means controlled by the adjustment of said flap means to a position corresponding to abnormal flight conditions for operating said movable surface means to effect said braking.

15. An aircraft as claimed in claim 14, said first operating means including a shaft and cam means thereon, said second operating means including cam-follower means engaged with said cam means and operatively connected to said surface means.

16. An aircraft as claimed in claim 14, said first operating means including a servo-motor, a shaft operatively connected to said servo-motor for rotation thereby, said shaft having cam means thereon, and speed responsive means responsive to the speed of said aircraft controlling said servo-motor, said second operating means including cam-follower means engaging said cam means, and a second servo-motor controlled by said cam-follower means and operatively connected to said movable surface means for moving the same.

17. An aircraft having curved lifting surfaces, and movable surface means on a portion of said surface for effecting aerodynamic braking of said aircraft, said movable surface means comprising superimposed flaps having levers connected thereto, hinge means supporting said flaps at the trailing edge of said portion, bar means, pivot support means intermediate the end portions of said bar means, connecting means connecting said end portions of said bar means with said levers, respectively, whereby rotation of said bar means about said pivot support means moves said flaps in unison, and means for moving the end portions of said bar means in the same direction for pivoting said flaps relatively.

18. An aircraft having curved lifting surfaces, and movable surface means on a portion of said surfaces for effecting aerodynamic braking of said aircraft, said movable surface means comprised of superimposed flaps having levers connected thereto, hinge means supporting said flaps at the trailing edge of said portion, bar means, pivot support means intermediate the end portions of said bar means, connecting means connecting the end portions of said bar means and said levers, respectively, a shaft having two sections movable relative to one another, means connecting one of said shaft means to said pivot support means, operating means for moving the last-named means whereby to move said pivot support means, thus to cause relative pivoting of said flaps, and second operating means connected to the other of said shaft sections for rotating said sections together whereby to pivot said bar means, thus to pivot said flaps in unison.

19. An aircraft as claimed in claim 17, said last-named means including an arm supporting said pivot support means at one end, axle means mounting said arm at its other end, and means for rotating said arm about the axis of said axle means.

20. In an aircraft as claimed in claim 12, lost motion means connecting said first and second operating means whereby to prevent operation of said second operating means by rapid, temporary compensating movements of said first operating means.

21. In an aircraft having lifting surfaces, an engine, means for controlling the power output of the engine, and aerodynamical braking means for producing an aerodynamical braking of said aircraft while simultaneously maintaining substantially constant the lift characteristics of said surfaces, operating means connected with said braking means for rendering said braking means operative and inoperative, selectively, and means interconnecting said operating means and said means for controlling the power output of said engine whereby to render said braking means inoperative when said engine is propelling the aircraft.

22. In an aircraft having an engine, means for controlling the power output of the engine whereby to drive the aircraft in a predetermined range of speeds and lifting surfaces, means for producing an aerodynamical braking of said aircraft while simultaneously maintaining substantially constant the lift characteristics of said surfaces, operating means for rendering said braking means operative and inoperative, selectively, and means interconnecting said means for controlling the power output of said engine and said operating means for holding said braking means inoperative when the speed of the aircraft is flying within said predetermined range of speed.

23. In an aircraft having an engine, means for controlling the power output of the engine, lifting surfaces including curved portions and adjustable flap portions operable for varying the effect of said curved portions, and displaceable means for operating said flaps between normal and extended positions, braking means for producing an aerodynamical braking of said aircraft while maintaining substantially constant the lift characteristics of said lifting surfaces, and means interconnecting said means for controlling the power output of the engine and said displaceable means for operating said braking means when said displaceable means are displaced a predetermined amount and, concurrently, said engine is in substantally non-driving condition.

24. In an aircraft having an engine for driving the aircraft, means for controlling the power output of the engine, and lifting surfaces, aerodynamical braking means for producing an aerodynamical braking of said aircraft while simultaneously maintaining substantially constant the lift characteristics of said lifting surfaces, and operating means for said braking means comprising a servo-motor, driving connection means connected between the output side of said servo-motor and said braking means, said servo-motor having a valve in the fluid circuit operable for operating the servo-motor when the valve is opened, and means connecting said valve and said means for controlling the power output of the engine for opening said valve only when said engine is in non-driving condition.

25. In an aircraft having an engine having an intake manifold and means for controlling the power output of the engine whereby to drive the aircraft in a predetermined range of speeds, wheel brakes, first operating means for said wheel brakes, and lifting surfaces, means for producing an aerodynamical braking of said aircraft while simultaneously maintaining substantially constant the lift characteristics of said surfaces, second operating means for said aerodynamical braking means, pressure-responsive disabling means for said second operating means, a Venturi-tube conduit means normally connecting said Venturi tube to said disabling means whereby the Venturi tube causes reduction of pressure in said disabling means for disabling said second operating means, second conduit means connected between the intake manifold of said engine and said disabling means, and valve means operated by said first operating means for closing said first conduit means and opening the second conduit means upon application of said wheel brakes.

26. An air craft according to claim 2 further including actuating means for operating said means for varying the lift of the wing according to the speed of said aircraft along its path of travel.

ETTORE BUGATTI.